Dec. 1, 1953  J. ST. L. PHILPOT  2,660,922
INTERFERENCE MICROSCOPE
Filed May 31, 1949  2 Sheets-Sheet 2
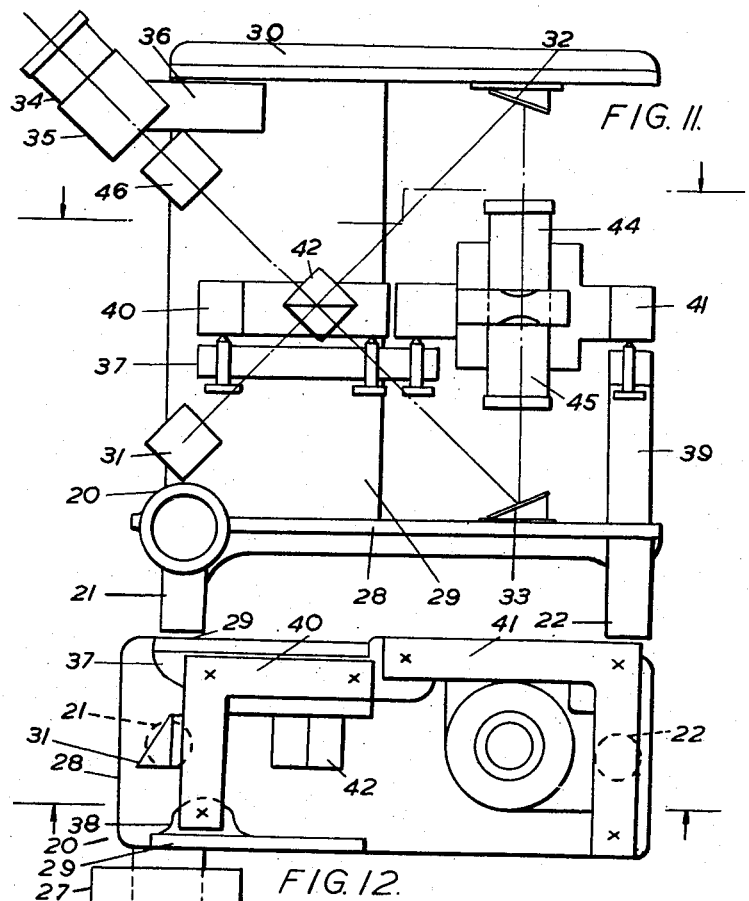
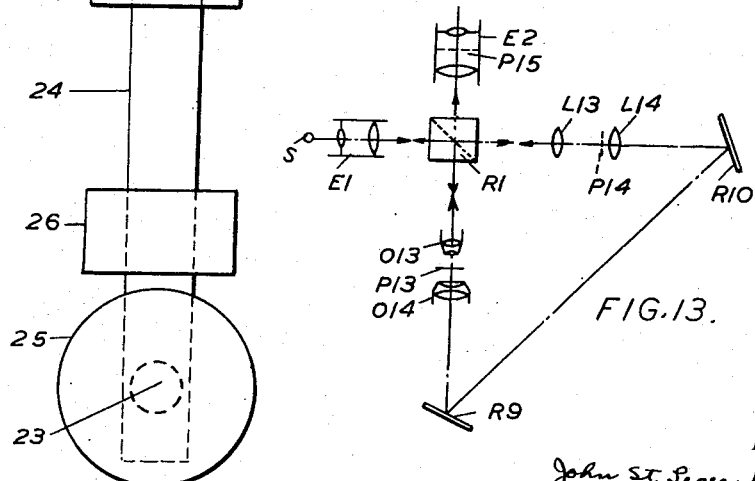
Inventor
John St. Leger Philpot
By
Watson, Cole, Grindle & Watson
Attorney

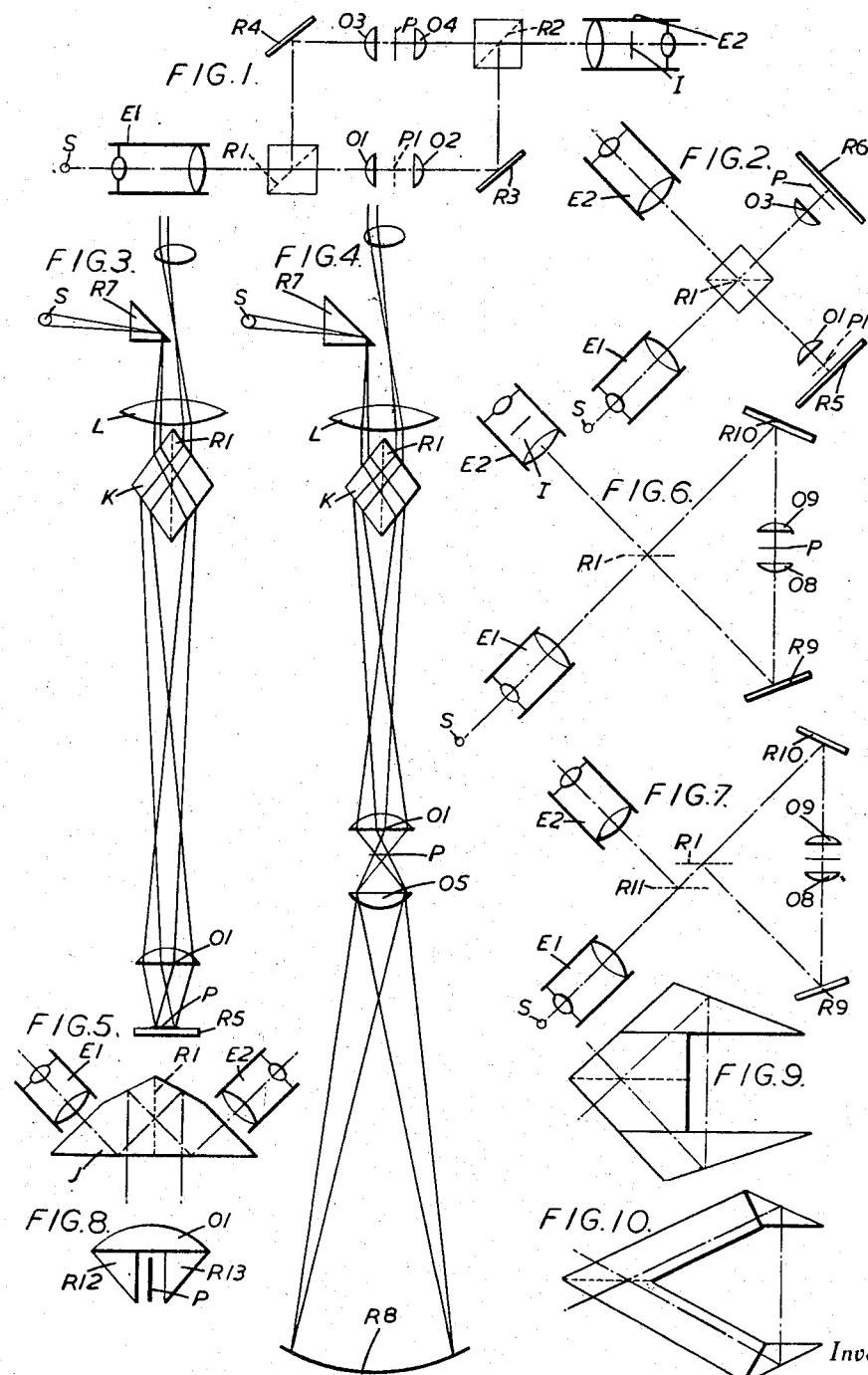

Patented Dec. 1, 1953

2,660,922

UNITED STATES PATENT OFFICE 2,660,922

INTERFERENCE MICROSCOPE

John St. Leger Philpot, Didcot, England, assignor, by mesne assignments, to National Research Development Corporation, London, England Application May 31, 1949, Serial No. 96,192

Claims priority, application Great Britain June 7, 1948

5 Claims. (Cl. 88—39)

This invention relates to microscopes and has for an object to provide an improved interference microscope in which a high numerical aperture of both the viewing and illuminating systems can be attained.

An interference microscope is an optical system for examining an object in such a way that local variations in phase retardation introduced by the object (occasioned by differences in refractive index or in thickness of the material or in height of its reflecting surface) become apparent as differences in light intensity or colour. It can therefore be used inter-alia for examining colourless objects such as living cells.

A well-known example of interference microscopy is the so-called phase-contrast method of Zernicke (Physica 9; 686,974, (1942) in which light scattered by the object is caused to interfere with light directly transmitted by it. An other example is the use of a partially reflecting slide and cover-slip (Merton, Proc. Roy. Soc. A. 189; 309 and 191,1 (1947) also Ambrose Journ. Sci. Instr. 25, 137 (1948)) where light which has passed directly through the system interferes with light which has been multiply reflected by the slide and cover-slip. The Zernicke method has the drawback that any scattered light coinciding in direction with direct light has the wrong phase and acts against the remaining scattered light. In the Merton method only a narrow beam of light may be used unless a zone-plate (which is difficult to make for operation at more than one wave length) is inserted. This is because the retardation of the rays in a beam of light which has been reflected by the two partial reflectors depends on the angle which they make with the optic axis.

The invention may in one aspect be defined as a microscope comprising an interferometer in which a beam of light is split by partial reflection into two parts diverging from each other, the parts being recombined to show interference effects, and an objective lens system common to both parts of the split beam, so that interfering (i. e. vectorially combining) images of an object plane in the objective lens system are formed with locally differing phase retardation.

The split beams which interfere with one another may be caused to pass through the objective lens system either in opposite halves of the field or in opposite directions round an angular loop path.

In a simple optical system of the invention wherein the split beams pass in opposite directions round an angular loop path, these beams, though passing through the same objective, do not coincide but pass through on opposite sides of the axis of the objective. Co-incidence is secured, according to a further feature of the invention by providing for a relative rotation of the split beams through 180° about the axis. For the beam rotation either a lens or a prism system may be employed.

Other features of the invention are set out in the appended claims.

In carrying out the invention, partial reflectors for splitting and reconstituting the beam are obliquely inclined to the incident light rays, as in the well-known Michelson interferometer, so that the split beams branch out on separate axes and are recombined to fall on common axes. This facilitates the formation of co-incident images whereas in the Merton system the images fall one behind the other as a consequence of the development of co-axial beams from partial reflectors normal to and spaced along the axis.

Furthermore the partial reflectors are located not in the region of the object plane as in the Merton system but at points remote from such planes, where, even with high aperture condensers and objectives, the light rays make only small angles with their optic axis.

The essential functional parts of an interference microscope can be enumerated as follows; it being understood that in practice several functions can be performed by a common element A first partial reflector splits light from a source into two similar beams. The beams each pass through objectives to the second partial reflector, where they are recombined to form two new beams which may be termed the odd beam and the even beam.

The even beam contains light which has been transmitted by both partial reflectors combined with light which has been reflected by both partial reflectors. The odd beam contains the remaining light of the split beams; namely that transmitted by the first partial reflector and reflected by the second combined with that reflected by the first and transmitted by the second. The odd and even beams are complementary in the sense that a diminution of light by interference in one of them is compensated by an increase by re-inforcement in the other.

The even beam and the odd beam each contain two superposed images formed by the objectives in the split beams. If an object be placed in front of one of the objectives, the retardation of the light due to the refractivity of the object causes the interference between the two images to differ from point to point so that the object is seen in the form of a contour-map of phase retardations. The split beam having no object in it constitutes a comparison beam. Either the odd or the even beam may be used for viewing the object, the other beam being rejected. The odd beam is usually to be preferred, as in the even beam interference is not complete unless the first partial reflector is exactly semi-reflecting. A well-known way of describing the phase-change of a beam on passing through the object is to say that there is added to the beam light from the object differing in phase. This light will be referred to as scattered light regardless of whether it travels with the original beam or in some other direction. Actually some of it, particularly from very small objects, will travel backwards, and in some forms of the invention the backward scattered light is collected and may or may not be used to improve the visibility of the object. Also in some forms a beam may pass more than once through the object, producing scattered light in each transit.

In practice, the microscope will usually include condensers in the split beams to illuminate the object planes at high aperture, a collimator to permit of the use of a small source, and an eye-piece comprising a field lens to collect light from the objectives and an eye lens to magnify the image further as is usual in microscopy. The term "lens" is used throughout as an abbreviation for "lens or systems of lenses or curved reflector or system of curved reflectors."

The invention will be further described with reference to the accompanying drawings in which: Fig. 1 is a known optical system from which the invention is developed. Fig. 2 shows a variant due to Linnik and described by W. Von Kinder in Zeiss Nahrichten, August, 1937 and Figs. 3 to 13 show microscope systems embodying the invention and detailed variants therein.

In the arrangement of Fig. 1 light from a source S is projected by a collimator E1 upon an obliquely-inclined partial reflector R1 consisting for example of two prisms cemented together with a film of aluminium, silver or rhodium deposited from vapour between them. The light transmitted by the partial reflector passes through a condensing lens O1, an object plane P1, and an objective lens O2, and is then reflected at a mirror R3 on to a second partial reflector R2 similar to R1. Thence the reflected part of the light forms part of the odd beam described above and passes to an eyepiece E2 comprising a field lens and an eye lens, so that an image of the object plane is formed at I; the transmitted part of the light forms part of the even beam and is rejected at R2. The light reflected by the partial reflector R1 is reflected at a mirror R4 and then passes through a condensing lens O3, an object P and an objective lens O4 to the second partial reflector R2. Thence the transmitted light enters the odd beam and forms an image of the object at I; the reflected light is rejected in the even beam.

If no object is in position and the media at the two object planes are similar, the system may be adjusted so that the odd beam is dark because its components are in phase opposition. Then introduction of the object modifies the phase of the associated component beam and the object is seen as an image of brightness or colour dependent on the variation in refractive power from point to point in the object.

This optical system of Fig. 1 is easy to free from stray light due to unwanted reflections because the light is unidirectional through the branches of the system; but for the same reason the light passes but once through the object and the backwardly scattered light is lost so that image brightness is lost. Fig. 1 may be regarded as a form of the well-known Jamin interferometer with a microscope and its object introduced into one branch and another microscope, or the equivalent, without an object, introduced into the other branch. The Linnik system of Fig. 2 and the systems of the invention may be regarded as applications of the Michelson interferometer.

In the prior Linnik system shown in Fig. 2, a single partial reflector serves for splitting the beam and for recombining the split parts which are reflected to it by mirrors R5, R6. Light from the source S and collimator E1 is split at the partial reflector R1, the reflected light being condensed in a lens O1 reflected at a mirror R5 to return through the lens O1, which now serves as an objective lens, to the partial reflector whence part is reflected into the even beam which returns to the source and part is transmitted in the odd beam to an eye-piece E2. The light from the collimator which is transmitted at the partial reflector follows a similar path through a lens O3, returning from a mirror R6 to be partially transmitted to the source and partially reflected to the eye-piece. Thus interfering images of an object P and of an object plane P1 are formed in the eye-piece.

The system of Fig. 2 differs from that of Fig. 1 in that light passes twice through the object and the backward-scattered light is collected; but there are two image planes (direct and reflected) which do not coincide unless the object coincides with the mirror R6. Therefore, except with very thin objects, half the scattered light is out of focus and is merely a nuisance. Furthermore, the path of the backward-scattered light is shorter or longer than that of the forward-scattered by twice the object-mirror distance so that some of it will have the wrong phase except in special cases.

Fig. 3 shows a simple and effective form of interference microscope which can be made from an ordinary one merely by insertion of a special eye-piece. It is similar to the arrangement of Fig. 2 as regards beam paths, scattered light etc., but instead of two objectives and the complication in adjustment thereby involved, it uses two halves of a single objective. The field of view is divided into two semi-circular fields which are superposed and made to interfere. As shown, light from source S is reflected by a prism R7 through an eye-piece field lens L and is then refracted in a double prism K towards a partially reflecting surface R1 in the prism. The reflected part and the transmitted part then follow the paths shown through lens O1, object plane P and mirror R5. Replacement of the mirror by a lens O5 and a spherical mirror R8 as shown in Fig. 4 allows the reflected image to be brought into coincidence with the direct image.

It will be appreciated that in the arrangement of Fig. 3 or Fig. 4 one half of the object is compared with the other half. Such an arrangement is suitable for examination of thin suspensions of bacteria, etc. where the super-position of two half-fields causes no confusion.

In Fig. 5 is shown a prism J with a partially reflecting interior surface Rl, a collimator El and an eye-piece E2 which can be used instead of the elements R7, Rl, L, K, of Fig. 3 or Fig. 4. Its surfaces are used as reflecting instead of refracting surfaces to avoid chromatic aberration.

An embodiment of the invention involving an angular loop in the beam path is shown in Fig. 6. Light from a real or virtual source S goes through a collimator El and thence via the semi-reflector Rl and the full reflectors R9, Rl0 to the objectives O8, O9 travelling in both directions round the closed circuits, so that each objective acts as a condenser for one direction and as an objective for the other direction. The light then emerges from the system as an odd beam returning to source S and an even beam entering the eye or camera through eyepiece E2. In the absence of an object the partition of returning light between El and E2 depends on the alignment of the objectives and on the position of the plane of Rl relative to the line of intersection of R9 and Rl0. Adjustment of this position can be made to compensate for small errors in alignment; thus optimal interference can be secured merely by removing the eye-piece and adjusting the tilt of a mirror (e. g. mirror Rl0) about two axes until the whole aperture of the objectives is seen to be filled by one interference fringe (necessarily the central one). If now an object P is introduced the phase of both beams is altered to an equal extent by passage through the object, so that they are still in phase opposition (as regards entering El) provided they remain suitably superposed. Even if the object is markedly inhomogenous in refractive index or thickness in its two images formed in E2 at I by the objectives O8, O9 respectively will continue to be opposed like the illuminating beams provided that they overlap sufficiently accurately. However, if the overlap of the two images is destroyed by defocussing one of them, their interference will be destroyed, and any small region where the phase change differs by other than a whole number of wave-lengths from the average over the area occupied by its defocussed image will appear bright on a dark background. If a small object contains still smaller sub-objects the defocusing can be so adjusted that the object is dark like the background except at its edge while the sub-objects are bright.

An alternative way of making the images in Fig. 6 differ, in their phase rotation, from the background is based on the phase change which light undergoes on passing through a focus. If one image is formed slightly in front of the focal plane of the eye-piece and the other image is formed slightly behind that focal plane, they should combine to form a bright image on a dark background. This image will be but slightly out of focus, because the distance within which the phase-change occurs at a focus is said to be of the order of a wavelength.

In Fig. 6, the backward-scattered light is collected. It is in phase with the forward-scattered light if the optical path between the semi-reflector and the object is equal in the two directions. When this condition is satisfied the backward-scattered light from one beam can exactly replace that from the other beam which has gone round the wrong way and has thereby been defocussed. Thus, with an objective having a numerical aperture equal to that of the medium containing the object, the focussed image is in effect formed from light collected over a whole sphere, instead of over a hemisphere. This may give an unusually high resolving power, but the theory of such a case is not yet properly understood. Apart from this possibility, the main advantage of Fig. 6 is in simplicity and ease of adjustment. A slight disadvantage is that the system uses the even beam, not the odd beam, so that interference is complete only if Rl is exactly semi-reflecting; for if $b$ is the fraction of light reflected, and $1-b$ that transmitted, the two beams which are required to interfere have intensities $b^2$ and $(1-b)^2$ instead of equal intensities $b(1-b)$ as in the other examples which use the odd beam. To obviate the need for an exact semi-reflector, the odd beam may be used with the aid of a second partial reflector Rll as shown in Fig. 7. The second partial reflector leads to some wastage of light; it enables a black background to be achieved with an inexact semi-reflector but, for the spherical aperture effect mentioned above to be perfect true semi-reflection is still necessary.

Figs. 6 and 7 represent a cyclic type of interferometer in that light travelling down each arm of the interferometer reappears travelling up the other arm. This closed-circuit principle was used by Michelson and Morley and Lodge for studying ether drift and by Zeeman for studying phase change on reflection but its valuable properties in relation to microscopy have not previously been recognised or applied.

The arrangement of Fig. 3 can be modified to a cyclic type by replacing the mirror R5, by two right-angled prisms Rl2, Rl3 cemented to the objective Ol as shown in Fig. 8; this variant is suitable for use with low power objectives where the restricted size of the object is no disadvantage.

Instead of the spaced reflecting elements Rl, R9, Rl0 of Fig. 6 arrangements of prisms such as shown in Fig. 9 or Fig. 10 may be used.

The example shown in Fig. 3 can be used for examining reflecting objects, which can replace the mirror R5. Small local differences in height of the surface of the object then cause differences in interference. An important application is to metallurgy.

The microscope optical systems described may be set up in instruments using techniques well known in microscopy.

Figs. 11 and 12 are two sectional and partly diagrammatic views of a microscope having novel constructional features and embodying the optical system of Fig. 6.

The instrument of Figs. 11 and 12 comprises a frame 20, L-shaped in plan, and having three legs 21, 22, 23. As shown, the frame comprises an optical bench 24 on which are mounted a light-source 25 and collimating or beam-forming lenses 26, 27. One end support for the optical bench is provided by a housing comprising a platform 28, walls 29 and a top plate 30.

A reflecting prism 31 reflects the beam from the optical bench towards an inclined reflector 32 attached to the top plate. Light incident on this reflector is directed towards a similar inclined reflector 33 mounted on the platform and thence towards an eye-piece 34 adjustable in a barrel 35 fixed to the walls 29 by means of a bracket 36.

Brackets 37 and 38 project inwardly from the walls 29 and standards 39 rise from the platform to provide adjustable three-point supports for two L-shaped sub-frames 40, 41.

Sub-frame 40 has mounted upon it a partial reflector unit 42 comprising two prisms with a partial reflecting surface between them. Sub-frame 41 has mounted upon it two accurately aligned objectives 44, 45, and provision is made for the insertion of slides between these objectives. A pivoted stage (not shown) for the slides may be arranged to move angularly in a horizontal plane to carry the slides into position.

A camera may be arranged above the optical bench on a parallel axis to receive light from a reflecting prism 46 (similar to the prism 31) located in the light path to the eye-piece 34. Prism 46 may be removable to provide for direct viewing or photographic recording as alternatives; or it may be partially reflecting to permit direct viewing for adjustment and timing purposes concurrently with the taking of photographs.

From the foregoing description of the instrument with reference to Figs. 11 and 12 it will readily be seen that the optical system is that of Fig. 6, with a reflector inserted between the light collimator and the partial reflector for convenience in disposing the components, and with an optional reflector in the outgoing light path for use in photographic recording.

It will be seen also that the objectives on their sub-frame 41 are readily removable and replaceable, and that the partial reflector on its sub-frame 40 is likewise removable. In the absence of the partial reflector the instrument functions as an ordinary microscope without interference effects.

In the optical arrangement of Fig. 6 the interfering rays, though going through the same objective system do not coincide but pass through on opposite sides of the objective axis. This non co-incidence can be avoided by a relative rotation of the beams through 180° about the optic axis. All interfering rays traversing the centre of the field then coincide everywhere, while for other parts of the field they lie parallel and close together. The result is that even bad optical components can give a dark interference spot in the centre of the field, darker than even high-quality components give with unrotated beams. The beams may be rotated by either a prism or a lens. A lens is advantageous in that it can magnify a condenser-formed image to the same size as the objective-formed image, so that a cyclic interference microscope with reversing lens can use one objective and a good condenser instead of the two objectives which are needed without the reversing lens. This not only reduces the cost but enables the object to be mounted between a slide and coverslip in the ordinary way instead of between two coverslips as is required by the two objectives. Such an optical system can be incorporated in a standard microscope with but small alteration. The reversing lens provides a further advantage in that it causes the interference fringes to be focussed in the same plane as the object instead of near the back lens of the objective. This allows the object to be seen as either white on black or black on white, merely by moving it about the field.

This further form of the invention is exemplified in, and will be more fully understood, by reference to the optical system of Fig. 13. Light from a source S and a collimator E1 is directed upon a partial reflector R1. The transmitted part of the beam passes to a mirror R10 thence to a mirror R9 and back to the partial reflector where it is partly transmitted to an eye-piece E2. The reflected part of the initial beam traverses the same angular loop in the reverse direction and is partially reflected to the eye-piece E2.

The system differs from that of Fig. 6 in that a reversing lens L13 and a field lens L14 co-operating therewith, are inserted in the angular loop. This permits the use of a conventional objective O13 and co-operating condenser O14 with the object plane P13 between them. Normal slides and cover-slips can be inserted at the object plane. Images of the object are formed at P14 and P15.

I claim:

1. An interference microscope for the examination of objects through which light can pass, comprising, in combination, a collimator, a partially reflecting, partially transmitting reflector disposed in the path of a light beam from the collimator with its partially reflecting, partially transmitting surface set obliquely to this path, two reflecting devices disposed one in the path of each of the reflected and the transmitted part beams from the reflector at angles such that the part beams are redirected to travel in opposite directions along one and the same path between the reflecting devices, means for supporting an object in, and in a plane transverse to, the common path of the two part beams, two objective lenses disposed one on each side of the object plane and acting each as a condenser for light traveling in one direction and as an objective for light traveling in the other direction, and an eyepiece disposed in the path of a composite image-forming beam derived from the two beams passing away from the object plane along the common path of the two original part beams toward the reflector, the power and positioning of each of the objective lenses being such that the two images which are to interfere are formed as images of equal size lying in at least substantially the same plane at an appropriate distance along the light path to the eyepiece.

2. An interference microscope as claimed in claim 1, having a second partially reflecting, partially transmitting reflector situated in the light path between the first mentioned reflector and the collimator in position to reflect to the eyepiece a part of the composite image-forming beam which it receives from the first mentioned reflector.

3. An interference microscope as claimed in claim 1, having a frame, a three-point mounting for the frame, and a third reflecting device, the collimator being mounted on the frame and extending in a vertical plane containing two of the mounting points, the reflector, reflecting devices, objective lenses, and eyepiece being disposed in the vertical plane containing the third mounting point and one of the two first mentioned mounting points, the third reflecting device being positioned for reflecting the beam from the collimator to the reflector, and supporting means for the members disposed in the second mentioned vertical plane.

4. An interference microscope as claimed in claim 3, including detachable subframes for the reflector and for the objective lenses.

5. An interference microscope as claimed in claim 1, further comprising a reversing lens and a cooperating field lens interposed in one of the two part-beam path sections between the partial reflector and the objective/object-plane/objective assemblage, the power and positioning of the last named lenses and of the two objective lenses being such that the two images which are to interfere and be formed as images of equal size lie in at least substantially the same plane at an appropriate distance along the light path to the eyepiece.

JOHN ST. LEGER PHILPOT.

References Cited in the file of this patent

UNITED STATES PATENTS

| Number | Name | Date |
| --- | --- | --- |
| 1,470,770 | Siedentopf | Oct. 16, 1923 |
| 1,573,401 | Heine | Feb. 16, 1926 |
| 2,265,784 | Von Baeyer | Dec. 9, 1941 |

FOREIGN PATENTS

| Number | Country | Date |
| --- | --- | --- |
| 239,120 | Germany | Oct. 10, 1911 |
| 355,911 | Great Britain | Sept. 3, 1931 |
| 474,809 | Great Britain | Nov. 8, 1937 |
| 555,672 | Great Britain | Sept. 2, 1943 |